US011769453B2

(12) United States Patent
In et al.

(10) Patent No.: US 11,769,453 B2
(45) Date of Patent: Sep. 26, 2023

(54) ELECTROSTATIC DISCHARGE CIRCUIT AND DISPLAY DEVICE INCLUDING THE SAME

(71) Applicant: Samsung Display Co., LTD., Yongin-si (KR)

(72) Inventors: Hai Jung In, Yongin-si (KR); Min Ku Lee, Yongin-si (KR); Seung Hee Lee, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 17/884,838

(22) Filed: Aug. 10, 2022

(65) Prior Publication Data

US 2023/0206833 A1 Jun. 29, 2023

(30) Foreign Application Priority Data

Dec. 29, 2021 (KR) ........................ 10-2021-0191569

(51) Int. Cl.

*H02H 9/04* (2006.01)
*G09G 3/3233* (2016.01)
*G09G 3/3266* (2016.01)
*G09G 3/3291* (2016.01)

(52) U.S. Cl.

CPC ......... *G09G 3/3233* (2013.01); *G09G 3/3266* (2013.01); *G09G 3/3291* (2013.01); *G09G 2300/0426* (2013.01); *G09G 2300/0819* (2013.01); *G09G 2300/0852* (2013.01); *G09G 2310/027* (2013.01); *G09G 2310/08* (2013.01); *G09G 2330/04* (2013.01)

(58) Field of Classification Search

CPC .. G09G 3/3233; G09G 3/3266; G09G 3/3291; G09G 2300/0426; G09G 2300/0819; G09G 2300/0852; G09G 2310/027; G09G 2310/08; G09G 2330/04; H01L 27/0285; H02H 9/046

USPC ........................................................... 361/56

See application file for complete search history.

(56) References Cited

U.S. PATENT DOCUMENTS 6,274,908 B1 8/2001 Yamaguchi et al.
7,755,875 B2 7/2010 Kobashi
7,804,669 B2 9/2010 Worley (Continued)

FOREIGN PATENT DOCUMENTS

CN 103268876 8/2013
KR 10-0196403 6/1999

(Continued)

*Primary Examiner* — Abdul-Samad A Adediran

(74) *Attorney, Agent, or Firm* — KILE PARK REED & HOUTTEMAN PLLC

(57) ABSTRACT

A display panel includes pads and pixels, signal lines electrically connected to the pads, and a protection circuit electrically connected between one signal line among the signal lines and a first voltage line. The protection circuit includes a first transistor, a first resistor, and a first capacitor. The first transistor includes a first electrode electrically connected to the first voltage line, a second electrode electrically connected to the one signal line, and a gate electrode. The first resistor is electrically connected between the gate electrode of the first transistor and the one signal line. The first capacitor is disposed between the gate electrode of the first transistor and the one signal line.

19 Claims, 9 Drawing Sheets

(56) References Cited

U.S. PATENT DOCUMENTS

| | | | | |
|---|---|---|---|---|
| 8,675,323 | B2 | 3/2014 | Sudo | |
| 8,698,137 | B2 | 4/2014 | Yamazaki et al. | |
| 2006/0119998 | A1* | 6/2006 | Yang | H01L 27/0285 361/56 |
| 2019/0326751 | A1* | 10/2019 | Xi | H02H 9/046 |

FOREIGN PATENT DOCUMENTS

| | | |
|---|---|---|
| KR | 10-0298983 | 10/2001 |
| KR | 10-0760498 | 9/2007 |
| KR | 10-1197509 | 11/2012 |
| KR | 10-1870995 | 6/2018 |
| KR | 10-1940978 | 1/2019 |
| KR | 10-2000056 | 9/2019 |

* cited by examiner

GLn: GWLn, GRLn, GILn, EMLn
PL: PL1, PL2, PL3, PL4

ELECTROSTATIC DISCHARGE CIRCUIT AND DISPLAY DEVICE INCLUDING THE SAME

CROSS-REFERENCE TO RELATED APPLICATION(S)

This application claims priority to and benefits of Korean patent application 10-2021-0191569 under 35 U.S.C. § 119(a), filed on Dec. 29, 2021, in the Korean Intellectual Property Office, the entire contents of which is incorporated herein by reference.

BACKGROUND

1. Technical Field

The disclosure relates to an electrostatic discharge circuit and a display device including the same.

2. Description of the Related Art

A display device includes a data driver, a gate driver, and pixels. The data driver provides data signals to the pixels through data lines. The gate driver generates a gate signal by using a gate power source and a clock signal, which are provided from the outside, and sequentially provides the gate signal to the pixels through gate lines. Each of the pixels records a corresponding data signal in response to the gate signal, and emits light, corresponding to the data signal.

When static electricity is introduced from the outside, the internal circuits of the display device may malfunction or be damaged due to the static electricity.

It is to be understood that this background of the technology section is, in part, intended to provide useful background for understanding the technology. However, this background of the technology section may also include ideas, concepts, or recognitions that were not part of what was known or appreciated by those skilled in the pertinent art prior to a corresponding effective filing date of the subject matter disclosed herein.

SUMMARY

Embodiments provide an electrostatic discharge circuit and a display device including the same, which can protect an internal circuit from static electricity.

In an embodiment of the disclosure, a display device may include pads and pixels; signal lines electrically connected to the pads; and a protection circuit electrically connected between one signal line among the signal lines and a first voltage line. The protection circuit may include a first transistor including a first electrode electrically connected to the first voltage line, a second electrode electrically connected to the one signal line, and a gate electrode; a first resistor electrically connected between the gate electrode of the first transistor and the one signal line; and a first capacitor disposed between the gate electrode of the first transistor and the one signal line.

An alternating current (AC) signal may be applied to the one signal line.

The display device may further include a gate driver that provides a gate signal to the pixels based on a start signal and a clock signal. The signal lines may include a start signal line through which the start signal is provided to the gate driver and a clock signal line through which the clock signal is provided to the gate driver. The protection circuit may be electrically connected to at least one of the start signal line and the clock signal line.

The display device may further include a data driver that provides data signals to the pixels. The signal lines may include data lines through which the data signals are provided to the pixels. The protection circuit may be electrically connected to each of the data lines.

The display device may further include a substrate. The substrate may include a pad area in which the pads are disposed and a display area in which the pixels are disposed. The protection circuit may be disposed in the pad area.

The first resistor may consume energy of an electrostatic voltage applied to the one signal line. The first resistor may be electrically disconnected by a heat of the energy.

The first capacitor may maintain a voltage difference between the one signal line and the gate electrode of the first transistor within a reference range, and may allow the one signal line and the gate electrode of the first transistor to be capacitor-coupled to each other to operate the first transistor in case that the first resistor is damaged.

The protection circuit may further include a second transistor including a first electrode electrically connected to the one signal line, a second electrode electrically connected to a second voltage line, and a gate electrode; a second capacitor disposed between the one signal line and the gate electrode of the second transistor; and a second resistor electrically connected between the gate electrode of the second transistor and the second electrode of the second transistor. A second voltage applied to the second voltage line may be lower than a first voltage applied to the first voltage line.

Each of the first transistor and the second transistor may further include an auxiliary gate electrode. The protection circuit may further include a common resistor electrically connected between the auxiliary gate electrode of each of the first transistor and the second transistor and a third voltage line; and a common capacitor disposed between the one signal line and the auxiliary gate electrode of each of the first transistor and the second transistor.

Each of the first transistor and the second transistor may include an oxide semiconductor. A third voltage applied to the third voltage line may be lower than the second voltage applied to the second voltage line.

The third voltage applied to the third voltage line may be cyclically changed.

The protection circuit may further include a third transistor including a first electrode electrically connected to the first voltage line, a second electrode electrically connected to the first electrode of the first transistor, a gate electrode, and an auxiliary gate electrode electrically connected to the auxiliary gate electrode of the first transistor; a third resistor electrically connected between the gate electrode of the third transistor and the second electrode of the third transistor; and a third capacitor disposed between the gate electrode of the third transistor and the second electrode of the third transistor.

The protection circuit may further include a fourth transistor including a first electrode electrically connected to the second electrode of the second transistor, a second electrode electrically connected to the second voltage line, a gate electrode, and an auxiliary gate electrode electrically connected to the auxiliary gate electrode of the second transistor; a fourth capacitor disposed between the first electrode of the fourth transistor and the gate electrode of the fourth transistor; and a fourth resistor electrically connected between the gate electrode of the fourth transistor and the second voltage line.

The protection circuit may further include a fifth transistor including a first electrode electrically connected to the first voltage line, a second electrode electrically connected to the one signal line, a gate electrode electrically connected to the gate electrode of the first transistor, and an auxiliary gate electrode electrically connected to the auxiliary gate electrode of the first transistor; and a fifth resistor electrically connected between the gate electrode of the fifth transistor and the second electrode of the fifth transistor.

The protection circuit may further include a sixth transistor including a first electrode electrically connected to the one signal line, a second electrode electrically connected to the second voltage line, a gate electrode electrically connected to the gate electrode of the second transistor, and an auxiliary gate electrode electrically connected to the auxiliary gate electrode of the second transistor; and a sixth resistor electrically connected between the gate electrode of the sixth transistor and the second voltage line.

The protection circuit may further include a seventh transistor including a first electrode electrically connected to the first voltage line, a second electrode electrically connected to the first electrode of the fifth transistor, a gate electrode, and an auxiliary gate electrode electrically connected to the auxiliary gate electrode of the fifth transistor; and a seventh resistor electrically connected between the gate electrode of the seventh transistor and the second electrode of the seventh transistor.

The protection circuit may further include an eighth transistor including a first electrode electrically connected to the second electrode of the sixth transistor, a second electrode electrically connected to the second voltage line, a gate electrode, and an auxiliary gate electrode electrically connected to the auxiliary gate electrode of the sixth transistor; and an eighth resistor electrically connected between the gate electrode of the eighth transistor and the second voltage line.

In an embodiment of the disclosure, an electrostatic discharge circuit electrically connected to a signal line to which an AC signal is applied, may include a first transistor including a first electrode electrically connected to a first voltage line, a second electrode electrically connected to the signal line, and a gate electrode; a first resistor electrically connected between the gate electrode of the first transistor and the signal line; and a first capacitor disposed between the gate electrode of the first transistor and the signal line.

The electrostatic discharge circuit may further include a second transistor including a first electrode electrically connected to the signal line, a second electrode electrically connected to a second voltage line, and a gate electrode; a second capacitor disposed between the signal line and the gate electrode of the second transistor; and a second resistor electrically connected between the gate electrode of the second transistor and the second electrode of the second transistor. A second voltage applied to the second voltage line may be lower than a first voltage applied to the first voltage line.

Each of the first transistor and the second transistor may further include an auxiliary gate electrode. The electrostatic discharge circuit may further include a common resistor electrically connected between the auxiliary gate electrode of each of the first transistor and the second transistor and a third voltage line; and a common capacitor disposed between the signal line and the auxiliary gate electrode of each of the first transistor and the second transistor.

BRIEF DESCRIPTION OF THE DRAWINGS

The above and other aspects and features of the disclosure will become more apparent by describing in detail embodiments thereof with reference to the attached drawings.

In the drawings, dimensions may be exaggerated for clarity of illustration. It will be understood that when an element is referred to as being "between" two elements, it can be the only element between the two elements, or one or more intervening elements may also be present. Like reference numerals refer to like elements throughout.

DETAILED DESCRIPTION OF THE EMBODIMENTS

Figure 1:
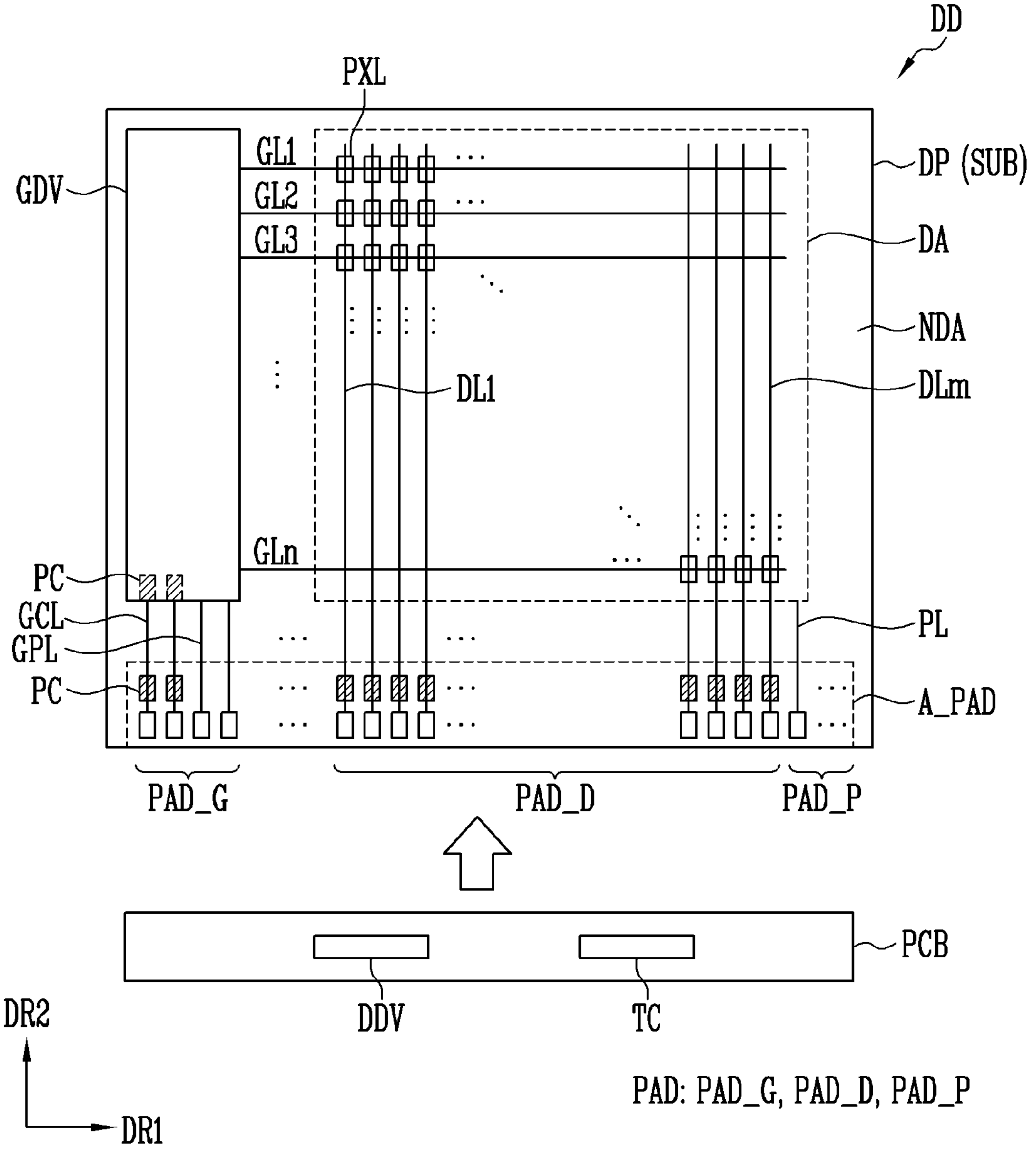
FIG. 1 is a block diagram illustrating a display device in accordance with embodiments of the disclosure.

The disclosure will now be described more fully hereinafter with reference to the accompanying drawings, in which embodiments are shown. This disclosure may, however, be embodied in different forms and should not be construed as limited to the embodiments set forth herein. Rather, these embodiments are provided so that this disclosure will be thorough and complete, and will fully convey the scope of the disclosure to those skilled in the art.

As used herein, the singular forms are intended to include the plural forms as well, unless the context clearly indicates otherwise.

In the specification and the claims, the term "and/or" is intended to include any combination of the terms "and" and "or" for the purpose of its meaning and interpretation. For example, "A and/or B" may be understood to mean "A, B, or A and B." The terms "and" and "or" may be used in the conjunctive or disjunctive sense and may be understood to be equivalent to "and/or."

In the specification and the claims, the phrase "at least one of" is intended to include the meaning of "at least one selected from the group of" for the purpose of its meaning and interpretation. For example, "at least one of A and B" may be understood to mean "A, B, or A and B."

It will be understood that, although the terms first, second, etc., may be used herein to describe various elements, these elements should not be limited by these terms. These terms are only used to distinguish one element from another element. For example, a first element may be referred to as a second element, and similarly, a second element may be referred to as a first element without departing from the scope of the disclosure.

Some embodiments are described in the accompanying drawings in relation to functional blocks, units, and/or modules. Those skilled in the art will understand that these blocks, units, and/or modules are physically implemented by logic circuits, individual components, microprocessors, hard wire circuits, memory elements, line connection, and other electronic circuits. This may be formed by using semiconductor-based manufacturing techniques or other manufacturing techniques. In the case of blocks, units, and/or modules implemented by microprocessors or other similar hardware, the units, and/or modules are programmed and controlled by using software, to perform various functions discussed in the disclosure, and may be selectively driven by firmware and/or software. In addition, each block, each unit, and/or each module may be implemented by dedicated hardware or by a combination dedicated hardware to perform some functions of the block, the unit, and/or the module and a processor (e.g., one or more programmed microprocessors and associated circuitry) to perform other functions of the block, the unit, and/or the module. In some embodiments, the blocks, the units, and/or the modules may be physically separated into two or more individual blocks, two or more individual units, and/or two or more individual modules without departing from the scope of the disclosure. Also, in some embodiments, the blocks, the units, and/or the modules may be physically separated into more complex blocks, more complex units, and/or more complex modules without departing from the scope of the disclosure.

It will be understood that when an element (or a region, a layer, a portion, or the like) is referred to as "being on," "connected to" or "coupled to" another element in the specification, it can be directly disposed on, connected or coupled to another element mentioned above, or intervening elements may be disposed therebetween.

It will be understood that the terms "connected to" or "coupled to" may include a physical or electrical connection or coupling.

"About," "substantially," or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, ±20%, ±10%, or ±5% of the stated value.

Unless otherwise defined or implied herein, all terms (including technical and scientific terms) used herein have the same meaning as commonly understood by one of ordinary skill in the art to which the disclosure pertains. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The disclosure is not limited to embodiments disclosed below, and may be implemented in various forms. Each embodiment disclosed below may be independently embodied or be combined with other embodiments.

In the following embodiments and the attached drawings, elements not directly related to the disclosure are omitted from depiction, and dimensional relationships among individual elements in the attached drawings are illustrated only for ease of understanding but not to limit the actual scale. It should note that in giving reference numerals to elements of each drawing, like reference numerals refer to like elements even though like elements are shown in different drawings.

FIG. 1 is a block diagram illustrating a display device in accordance with embodiments of the disclosure.

Referring to FIG. 1, the display device DD may include a display panel DP, a gate driver GDV, a data driver DDV, and a timing controller TC.

The display panel DP may include a substrate SUB, and the substrate SUB (or the display panel DP) may include a display area DA in which an image is displayed and a non-display area NDA except the display area DA. Pixels PXL may be disposed in the display area DA. The gate driver GDV, pads PAD, and signal lines may be disposed in the non-display area NDA. The non-display area NDA may include a pad area A_PAD located at a side of the display area DA, and the pads PAD may be disposed in the pad area A_PAD.

The display panel DP may include gate lines GL1, GL2, GL3, . . . , and GLn (n is a positive integer), data lines DL1 to DLm (m is a positive integer), and the pixels PXL. The gate lines GL1 to GLn may extend in a first direction DR1, and be sequentially disposed along a second direction DR2. The data lines DL1 to DLm may extend in the second direction DR2, and be sequentially disposed along the first direction DR1. The pixels PXL may be disposed or located in areas (e.g., pixel areas) partitioned by the gate lines GL1 to GLn and the data lines DL1 to DLm. Each of the pixels PXL may be electrically connected to at least one of the gate lines GL1 to GLn and one of the data lines DL1 to DLm.

In the embodiments, the display panel DP may further include the pads PAD and a protection circuit PC. The pads PAD may be connected to signal lines formed in the display panel DP, and transfer signals provided from the outside to the signal lines.

In an embodiment, the pads PAD may include gate pads PAD_G (or first pads), data pads PAD_D, and power pads PAD_P.

The gate pads PAD_G may transfer a gate control signal, a gate power voltage, and the like to the gate driver GDV through a gate control line GCL, a gate power line GPL, and the like. The gate control signal may include a start signal (or start pulse), clock signals, and the like, and be provided to the timing controller TC. The gate power voltage is a power voltage or a driving voltage, which is necessary for an operation of the gate driver GDV, and may be provided from a power supply (e.g., a PMIC) or the data driver DDV. The gate power voltage may include a first gate power voltage having a turn-on level at which a transistor in the gate driver GDV is turned on and a second gate power voltage having a turn-off level at which the transistor is turned off.

The data pads PAD_D may transfer data signals (or data voltages) to the data lines DL1 to DLm. The data signals may be provided from the data driver DDV.

The power pads PAD_P may transfer power voltages (or pixel power voltages) to a power line PL (or pixel power line). The power voltages are power voltages or driving voltages, which are necessary for an operation of the pixels PXL, and may be provided from the power supply.

The protection circuit PC may be provided in the pad area A_PAD (or be disposed adjacent to the pads PAD), and be electrically connected to at least one of the pads PAD (the signal lines connected to the pads PAD).

The protection circuit PC may be electrically connected to a pad (or signal line) to which a signal in a pulse form or an alternating current (AC) signal is applied, and may discharge static electricity (e.g., a surge) introduced through the pad from the outside, and may protect the internal circuits (or display circuits, e.g., the gate driver GDV and the pixels PXL, which are connected to the pad through the signal lines) from the static electricity. The protection circuit PC may be an electrostatic discharge (ESD) circuit (or ESD protection circuit).

For example, the protection circuit PC may be electrically connected to the gate control line GCL to which the gate control signal (e.g., the start signal and clock signals) is applied. In an example, the protection circuit PC may be connected to each of the data lines DL1 to DLm.

In some embodiments, the display panel DP may include a direct current (DC) protection circuit. The DC protection circuit may be electrically connected to pads to which a signal in a DC form (e.g., a constant voltage) is applied, and discharge static electricity introduced through the pads. For example, the DC protection circuit may be electrically connected to the gate power line GPL and the power line PL. Since the signal types (AC or DC) may be different from each other, the protection circuit PC may be configured different from the DC protection circuit.

Although the protection circuit PC is illustrated as being disposed in the pad area A_PAD, the disclosure is not limited thereto. For example, the protection circuit PC may be disposed adjacent to a protection target (e.g., the gate driver GDV). For example, the protection circuit PC may be disposed adjacent to both ends of the gate control line GCL.

The gate driver GDV may generate a gate signal, based on the gate control signal, and provide the gate signal to the gate lines GL1 to GLn. For example, the gate driver GDV may be implemented as a shift register which generates and outputs the gate signal by sequentially shifting the start signal in a pulse form by using the clock signals.

The gate driver GDV may be electrically connected to the timing controller TC via at least one circuit board PCB (e.g., a flexible circuit board and/or a printed circuit board). The gate driver GDV may be formed together with the pixels PXL in the display panel DP, but the disclosure is not limited thereto. For example, the gate driver GDV may be implemented as an integrated circuit, and be mounted on the circuit board PCB. Although a case where the gate driver GDV is disposed in the non-display area NDA has been illustrated in FIG. 1, the gate driver GDV is not limited thereto. For example, the gate driver GDV may be distributed and disposed in the display area DA (e.g., between the pixels PXL). The position of the gate driver GDV in the display panel DP is not limited to a specific position.

The data driver DDV may receive a data control signal and image data from the timing controller TC, generate data signals corresponding to the image data, and provide the data signals to the display panel DP. For example, the data driver DDV may generate data signals (or data voltages) corresponding to grayscale values in the image data, and supply the data signals to the data lines DL1 to DLm in units of pixel rows.

The data driver DDV may be mounted on the circuit board PCB, and be electrically connected to the timing controller TC. Also, the data driver DDV may be electrically connected to the data lines DL1 to DLm through the data pads PAD_D.

The timing controller TC may control the gate driver GDV and the data driver DDV. The timing controller TC may receive input image data (e.g., RGB data) and a control signal from an external device (e.g., a graphic processor), generate the gate control signal and the data control signal, based on the control signal, and generate image data by converting the input image data. The control signal may include a vertical synchronization signal, a horizontal synchronization signal, a data enable signal, a reference block signal, and the like. For example, the timing controller TC may convert the input image data into image data having a format corresponding to a pixel arrangement in the display panel DP. The timing controller TC may be mounted on the circuit board PCB.

The data driver DDV and the timing controller TC may be implemented as integrated circuits separate from each other, but the disclosure is not limited thereto. For example, the data driver DDV and the timing controller TC may be implemented as a single integrated circuit.

As described above, the protection circuit PC may be electrically connected to at least one of the pads PAD of the display panel DP, e.g., a pad (or signal line) to which a signal in a pulse form or an AC signal is applied, and may discharge static electricity introduced to a signal line.

Figure 2:
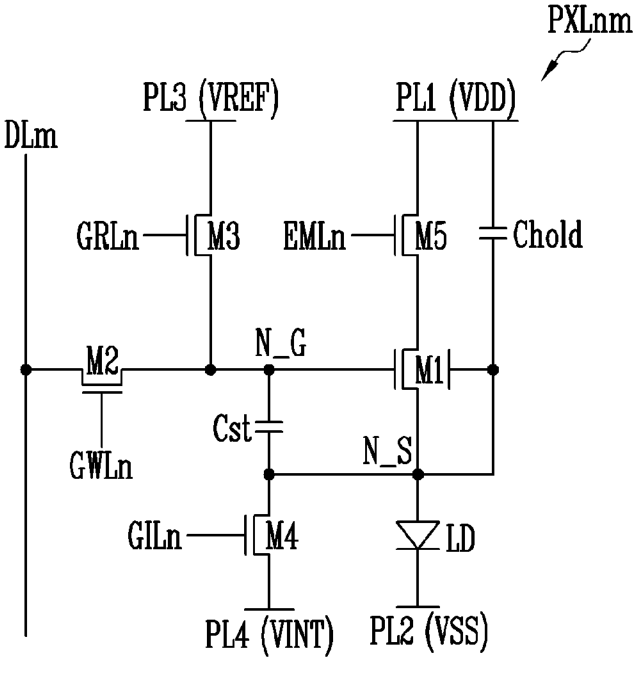
FIG. 2 is a schematic diagram of an equivalent circuit illustrating an embodiment of a pixel included in the display device of FIG. 1.

FIG. 2 is a schematic diagram of an equivalent circuit illustrating an embodiment of the pixel included in the display device of FIG. 1. The pixels PXL of FIG. 1 are substantially similar to each other. Therefore, for convenience of description, a pixel PXLnm located on an n-th pixel row and an m-th pixel column will be described.

Referring to FIGS. 1 and 2, the pixel PXLnm may be electrically connected to a first power line PL1, a second power line PL2, a third power line PL3, and a fourth power line PL4. The first power line PL1, the second power line PL2, the third power line PL3, and the fourth power line PL4 may be included in or correspond to the power line PL (see FIG. 1). A first power voltage VDD may be applied to the first power line PL1, a second power voltage VSS may be applied to the second power line PL2, a third power voltage VREF (or reference voltage) may be applied to the third power line PL3, and a fourth power voltage VINT (or initialization voltage) may be applied to the fourth power line PL4. The first and second power voltages VDD and VSS may be power voltages or driving voltages, which are necessary for an operation of the pixel PXLnm, and a voltage level of the first power voltage VDD may be higher than a voltage level of the second power voltage VSS.

The pixel PXLnm may be electrically connected to a gate line GLn and a data line DLm. The gate line GLn may be included in the gate lines GL1 to GLn (see FIG. 1) or may correspond to at least one of the gate lines GL1 to GLn. The gate line GLn may include a write gate line GWLn, a compensation gate line GRLn, an initialization gate line GILn, and an emission control line EMLn.

The pixel PXLnm may include thin film transistors M1 to M5, a storage capacitor Cst, a hold capacitor Chold, and a light emitting element LD. Each of the thin film transistors M1 to M5 may be an N-type transistor. For example, each of the thin film transistors M1 to M5 may include an oxide semiconductor. However, the disclosure is not limited thereto, and each of the thin film transistors M1 to M5 may include a silicon semiconductor (e.g., low temperature polysilicon (LTPS)).

A first thin film transistor M1 (or driving transistor) may include a first electrode connected to a second electrode of a fifth thin film transistor M5 (or the first power line PL1 through the fifth thin film transistor M5), a second electrode connected to a second pixel node N_S, a gate electrode connected to a first pixel node N_G, and a back-gate electrode connected to the second pixel node N_S. The back-gate electrode may be disposed to overlap with the gate electrode with an insulating layer interposed therebetween, comprise a body of the corresponding transistor, and serve as the gate electrode. The first thin film transistor M1 may be implemented as a back-gate transistor (or dual gate transistor) further including the back-gate electrode.

The first thin film transistor M1 may control a driving current flowing in the second power line PL2 via the light emitting element LD from the first power line PL1, in response to a voltage of the first pixel node N_G.

Since the back-gate electrode of the first thin film transistor M1 is electrically connected to the second pixel node N_S, a voltage change of the second electrode (e.g., a source electrode) of the first thin film transistor M1 may also be transferred to the back-gate electrode, while the pixel PXLnm emits light. Accordingly, a voltage between the second electrode and the gate electrode of the first thin film transistor M1 (e.g., a gate-source voltage), which is set through a compensation operation, can be maintained, and the pixel PXLnm may emit light of a selected luminance.

A second thin film transistor M2 (or switching transistor) may include a first electrode connected to the data line DLm, a second electrode electrically connected to the first pixel node N_G, and a gate electrode electrically connected to the write gate line GWLn. The second thin film transistor M2 may be turned on in response to a write gate signal applied to the write gate line GWLn, and electrically connect the data line DLm and the first pixel node N_G to each other.

A third thin film transistor M3 (or compensation transistor) may include a first electrode electrically connected to the third power line PL3, a second electrode electrically connected to the first pixel node N_G, and a gate electrode electrically connected to the compensation gate line GRLn. The third thin film transistor M3 may be turned on in response to a compensation gate signal applied to the compensation gate line GRLn, and the first pixel node N_G may be initialized by the third power voltage VREF.

A fourth thin film transistor M4 (or initialization transistor) may include a first electrode electrically connected to the second pixel node N_S, a second electrode electrically connected to the fourth power line PL4, and a gate electrode electrically connected to the initialization gate line GILn. The fourth thin film transistor M4 may be turned on in response to an initialization gate signal applied to the initialization gate line GILn. A voltage difference between the third power voltage VREF and the fourth power voltage VINT may be higher than a threshold voltage of the first thin film transistor M1. For example, the third power voltage VREF may have a level of about 0V to about 3V, and the fourth power voltage VINT may have a level of about −3V to about 3V.

The fifth thin film transistor M5 (or emission transistor) may include a first electrode electrically connected to the first power line PL1, the second electrode electrically connected to the first electrode of the first thin film transistor M1, and a gate electrode electrically connected to the emission control line EMLn.

The fifth thin film transistor M5 may be turned off in cast that an emission control signal is supplied to the emission control line EMLn, and may be turned on in other cases. When the fifth thin film transistor M5 is turned on, the first thin film transistor M1 may be electrically connected to the first power line PL1.

The storage capacitor Cst may be disposed (or formed) or electrically connected between the first pixel node N_G and the second pixel node N_S. The storage capacitor Cst may store a voltage difference between the voltage of the first pixel node N_G and a voltage of the second pixel node N_S. Also, the storage capacitor Cst may store a voltage based on a data signal.

The hold capacitor Chold may be disposed (or formed) or electrically connected between the first power line PL1 and the back-gate electrode of the first thin film transistor M1.

The light emitting element LD may be electrically connected between the second pixel node N_S and the second power line PL2, and emit light with a luminance corresponding to the driving current provided through the first thin film transistor M1.

The light emitting element LD may be an organic light emitting diode, an inorganic light emitting diode such as a micro LED (light emitting diode), or a quantum dot light emitting diode. Also, the light emitting element LD may be a light emitting element configured with a combination of organic and inorganic material. In FIG. 2, the pixel PXLnm is illustrated to include a single light emitting element LD. In other examples, the pixel PXLnm may include multiple light emitting elements, and the multiple light emitting elements may be connected in series, parallel, or series/parallel to each other.

Figure 3:
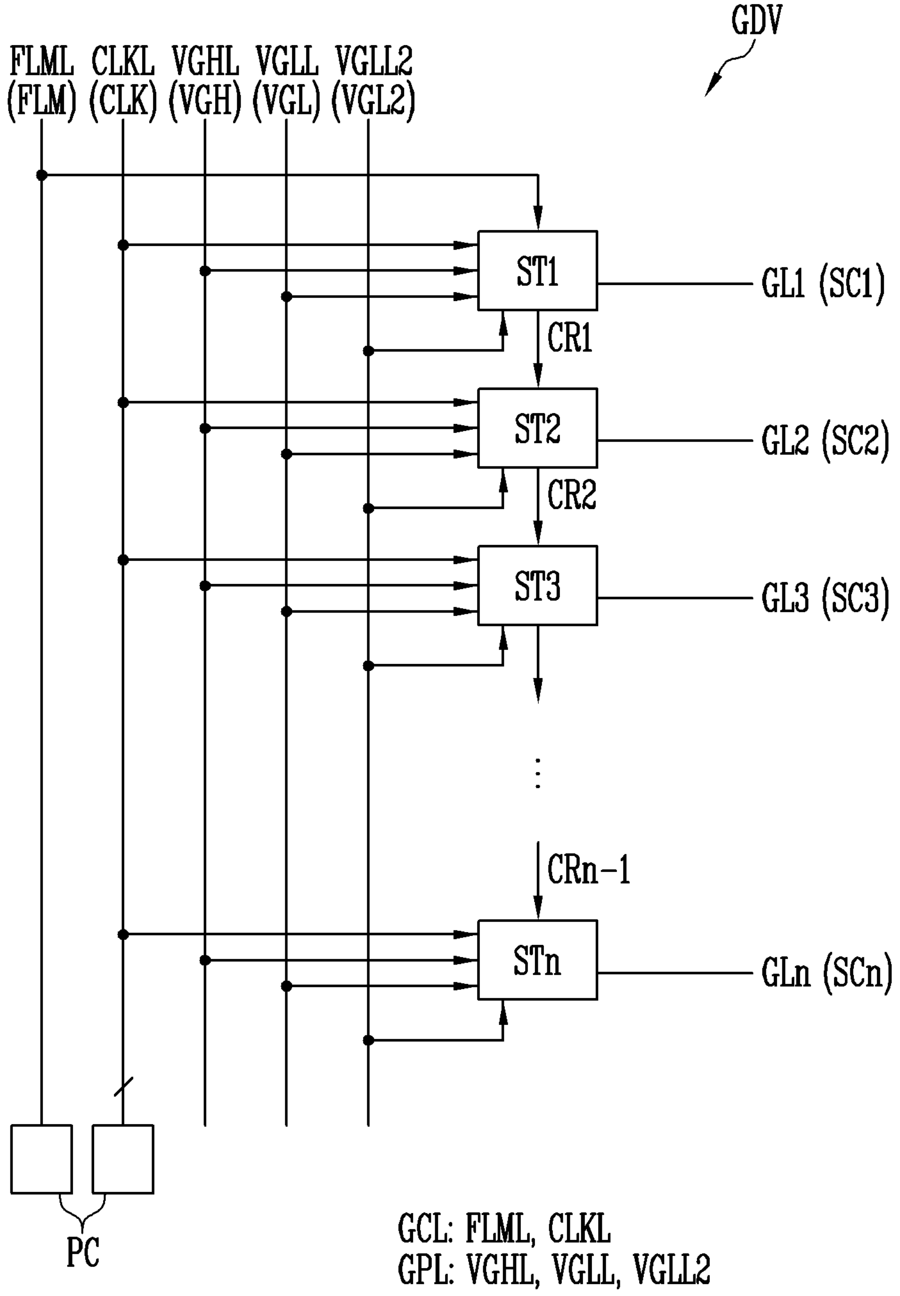
FIG. 3 is a schematic diagram of an equivalent circuit illustrating an embodiment of a gate driver included in the display device of FIG. 1.
Figure 4:
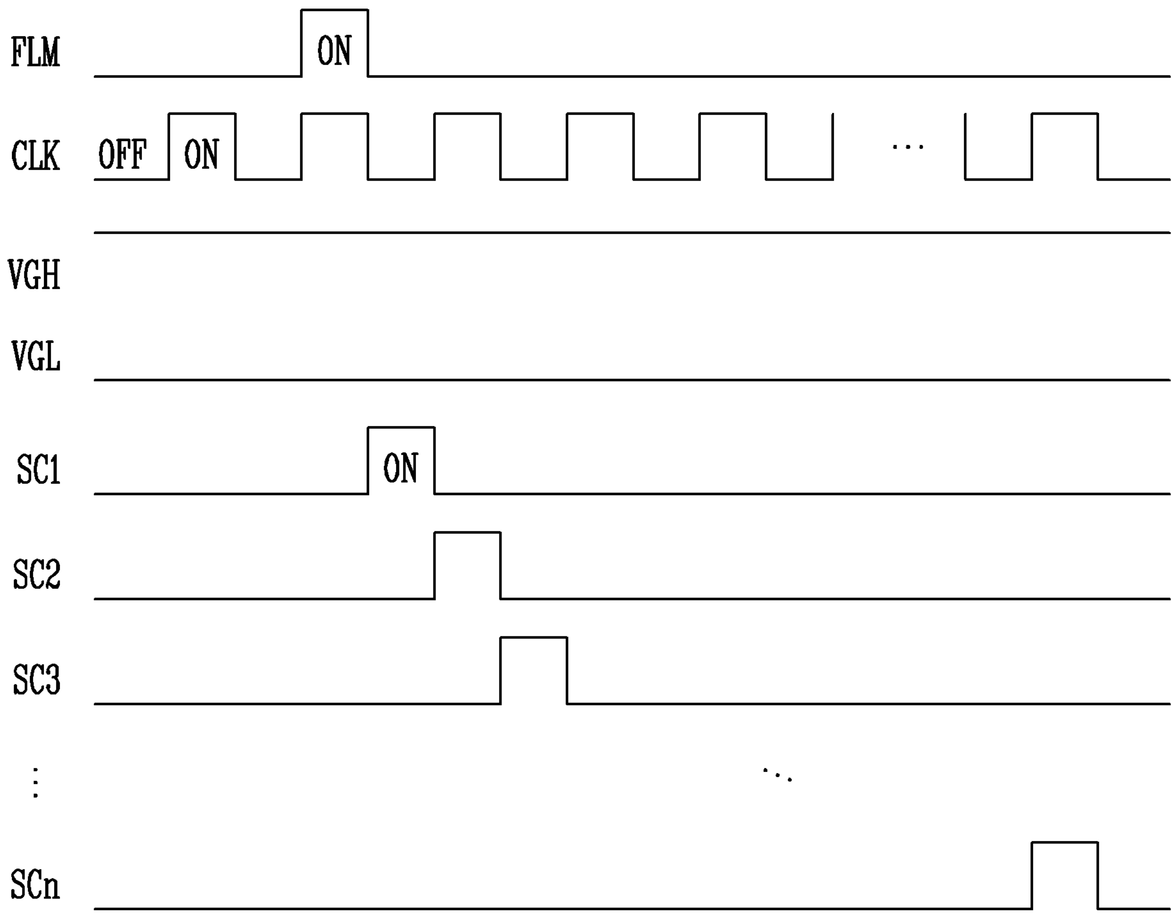
FIG. 4 is a waveform diagram illustrating signals measured in the gate driver of an embodiment shown in FIG. 3.

FIG. 3 is a schematic diagram of an equivalent circuit illustrating an embodiment of the gate driver included in the display device of FIG. 1. FIG. 4 is a waveform diagram illustrating signals measured in the gate driver of an embodiment shown in FIG. 3.

Referring to FIGS. 1 to 4, the gate driver GDV may include stages ST1, ST2, ST3, . . . , and STn.

The stages ST1, ST2, ST3, . . . , and STn may respectively provide gate signals to the gate lines GL1, GL2, GL3, . . . , and GLn. Each of the gate lines GL1 to GLn may correspond to at least one of the write gate line GWLn, the compensation gate line GRLn, the initialization gate line GILn, and the emission control line EMLn, which are described with reference to FIG. 2.

Each of the stages ST1 to STn may be electrically connected to a first gate power line VGHL, a second gate power line VGLL, a reference gate power line VGLL2, and a clock signal line CLKL (or clock signal lines). A first gate power voltage VGH may be applied to the first gate power line VGHL, a second gate power voltage VGL may be applied to the second gate power line VGLL, and a reference gate power voltage VGL2 may be applied to the reference gate power line VGLL2. The first gate power line VGHL, the second gate power line VGLL, and the reference gate power line VGLL2 may be included in the gate power line GPL. The first gate power voltage VGH may have a high voltage level or be maintained at the high voltage level, and the second gate power voltage VGL may have a low voltage level or be maintained at the low voltage level. The high voltage level may be higher than the low voltage level. The reference gate power voltage VGL2 may have a voltage level lower than the voltage level of the second gate power voltage VGL. A clock signal CLK (or clock signals) may be applied to the clock signal line CLKL. Referring to FIG. 4, the clock signal CLK may alternately have a turn-on level ON (or high voltage level) and a turn-off level OFF (or low voltage level). A start signal FLM (or start pulse) may be applied to a start signal line FLML. The start signal FLM may have a pulse of the turn-on level ON. The clock signal line CLKL and the start signal line FLML may be included in the gate control line GCL. Although the turn-on level ON is illustrated to be higher than the turn-off level OFF in FIG. 4, the disclosure is not limited thereto. For example, when a transistor is implemented with a P-type transistor instead of an N-type transistor, the turn-on level ON may be lower than the turn-off level OFF. The turn-on level ON may correspond to the low voltage level, and the turn-off level OFF may correspond to the high voltage level.

Each of the stages ST1 to STn may be electrically connected to the start signal line FLML or a carry line, and generate a gate signal corresponding to the start signal FLM provided through the start signal line FLML and a previous gate signal of a previous stage.

For example, a first stage ST1 may be electrically connected to the start signal line FLML, and generate a first gate signal SC1 corresponding to the start signal FLM. Referring to FIG. 4, the first gate signal SC1 may be delayed by a half cycle of the clock signal CLK from the start signal FLM, but the disclosure is not limited thereto. For example, a second stage ST2 may receive the first gate signal SC1 (or a first carry signal corresponding to the first gate signal SC1) from the first stage ST1 through a first carry line CR1, and generate a second gate signal SC2 corresponding to the first gate signal SC1. For example, a third stage ST3 may receive the second gate signal SC2 (or a second carry signal corresponding to the second gate signal SC2) from the second stage ST2 through a second carry line CR2, and generate a third gate signal SC3 corresponding to the second gate signal SC2. Similarly, an nth stage STn may receive a previous gate signal (or an (n−1)th carry signal corresponding to the previous gate signal) from a previous stage through an (n−1)th carry line CRn-1, and generate an nth gate signal SCn corresponding to the previous gate signal. Referring to FIG. 4, the stages ST1 to STn may sequentially generate gate signals SC1 to SCn corresponding to the start signal FLM.

A protection circuit PC may be electrically connected to the start signal line FLML to which the start signal FLM in a pulse form is applied. A protection circuit PC may be electrically connected to the clock signal line CLKL to which the clock signal CLK in an AC form is applied. As described with reference to FIG. 1, the protection circuit PC may be disposed at a front end of the gate driver GDV, to discharge static electricity introduced to the start signal line FLML and/or the clock signal line CLKL as shown in FIG. 3.

Figure 5:
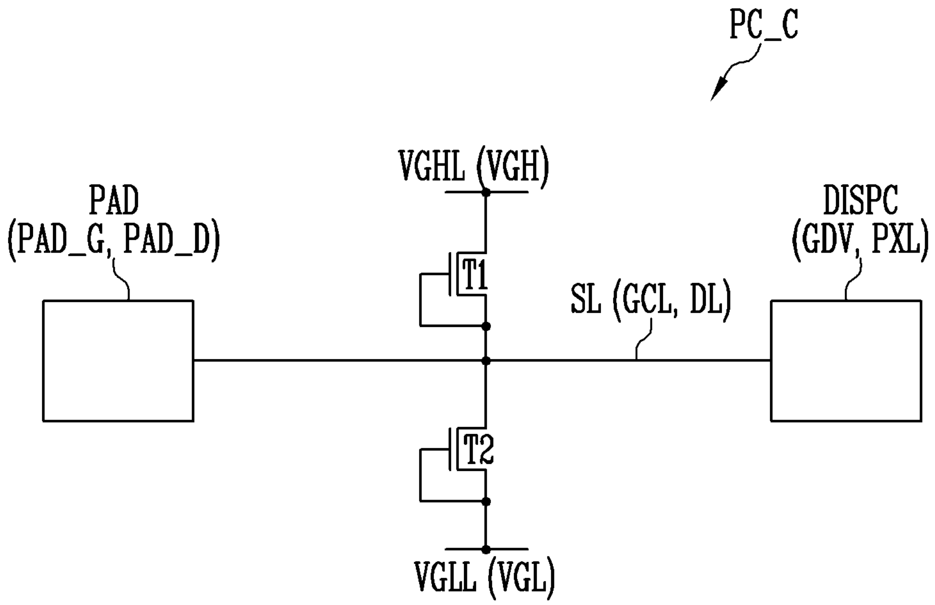
FIG. 5 is a diagram illustrating a comparative example of a protection circuit included in display devices.

FIG. 5 is a schematic diagram of an equivalent circuit illustrating a comparative example of the protection circuit that may be included in display devices.

Referring to FIGS. 1, 4, and 5, a signal line SL may electrically connect a pad PAD and a display circuit DISPC (or internal circuit) to each other, a protection circuit PC_C (or ESD circuit) may be electrically connected to the signal line SL. For example, the signal line SL may be the gate control line GCL, the pad PAD may be the gate pad PAD_G, and the display circuit DISPC may be the gate driver GDV. In another example, the signal line SL may be the data line DL, the pad PAD may be the data pad PAD_D, and the display circuit DISPC may be the pixels PXL. A signal within a range of a first gate power voltage VGH to a second gate power voltage VGL may be applied to the signal line SL. The first gate power voltage VGH and the second gate power voltage VGL may be determined by the voltage range of the signal applied to the signal line SL.

The protection circuit PC_C may include a first transistor T1 and a second transistor T2.

A first electrode of the first transistor T1 may be electrically connected to a first gate power line VGHL (or first voltage line), a second electrode of the first transistor T1 may be electrically connected to the signal line SL, and a gate electrode of the first transistor T1 may be electrically connected to the signal line SL.

When a voltage higher than the first gate power voltage VGH (or a first voltage) is applied to the signal line SL due to static electricity, the first transistor T1 may be turned on. For example, the first transistor T1 may be turned on in response to a voltage difference between the gate electrode and the first electrode of the first transistor T1. A current (e.g., a current caused by the static electricity) may flow in the first gate power line VGHL from the signal line SL, and the voltage at the signal line SL may become low. The first transistor T1 may decrease the voltage higher than the first gate power voltage VGH.

A first electrode of the second transistor T2 may be electrically connected to the signal line SL, a second electrode of the second transistor T2 may be electrically connected to a second gate power line VGLL (or second voltage line), and a gate electrode of the second transistor T2 may be electrically connected to the second gate power line VGLL.

When a voltage lower than the second gate power voltage VGL (or a second voltage) is applied to the signal line SL due to the static electricity, the second transistor T2 may be turned on. For example, the second transistor T2 may be turned on in response to a voltage difference between the gate electrode and the first electrode of the second transistor T2. A current may flow in the signal line SL from the second gate power line VGLL, and the voltage at the signal line SL may become high. The second transistor T2 may increase the voltage lower than the second gate power voltage VGL.

The voltage at the signal line SL is maintained as a voltage between the first gate power voltage VGH and the second gate power voltage VGL by the first transistor T1 and the second transistor T2, and the display circuit DISPC can be protected from the static electricity.

In some examples, the first transistor T1 and the second transistor T2 may include an oxide semiconductor.

A threshold voltage of each of the first transistor T1 and the second transistor T2 may be negative-shifted according to a characteristic of the oxide semiconductor. Each of the first transistor T1 and the second transistor T2 may be electrically connected in a diode form, and a leakage current may occur in each of the first transistor T1 and the second transistor T2 under a condition in which a gate-source voltage is 0V. A short circuit may occur between the first gate power line VGHL and the second gate power line VGLL.

When a surge voltage (which may be also referred to as a surge or an electrostatic voltage) having a relatively high voltage level is applied to the signal line SL, the first transistor T1 and/or the second transistor T2 may be damaged while an instantaneously high voltage (e.g., a voltage higher than a breakdown voltage) is applied to the first transistor T1 and/or the second transistor T2 or while an instantaneously large current flows through the first transistor T1 and/or the second transistor T2. Subsequently, when a higher surge voltage is generated, the protection circuit PC-C may not protect the display circuit DISPC.

Figure 6:
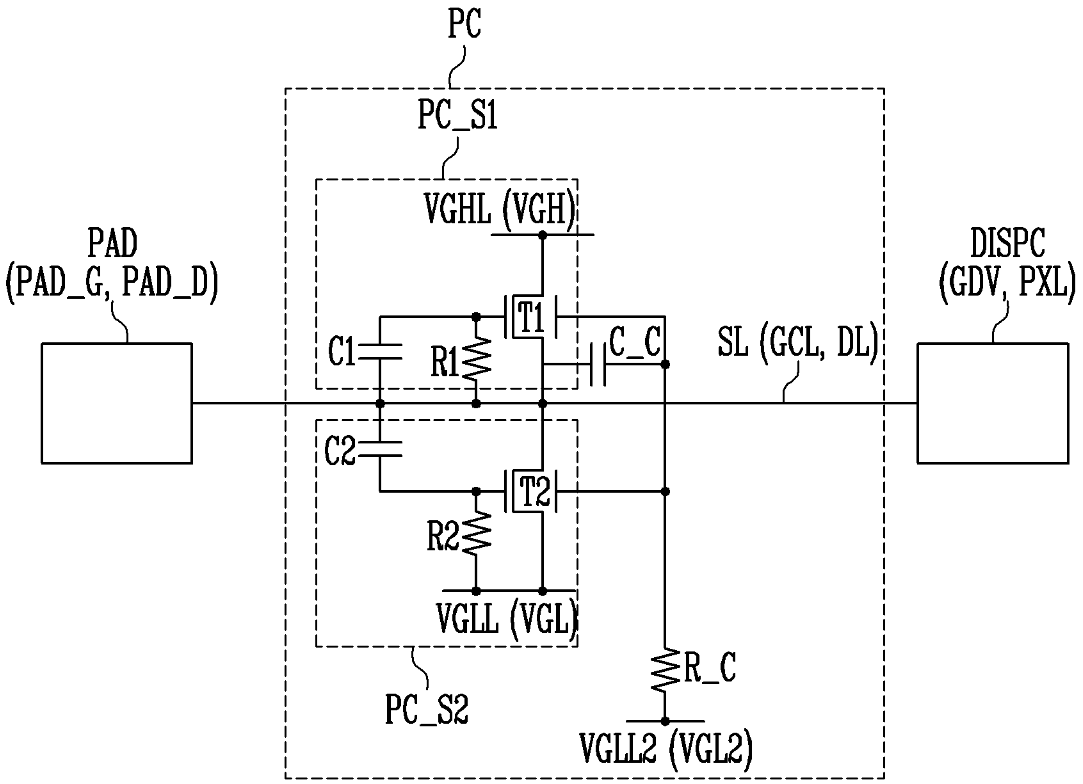
FIG. 6 is a schematic diagram of an equivalent circuit illustrating an embodiment of the protection circuit included in the display device of FIG. 1.

FIG. 6 is a schematic diagram of an equivalent circuit illustrating an embodiment of a protection circuit included in the display device of FIG. 1.

Referring to FIGS. 1, and 6, the protection circuit PC may include a first transistor T1, a first resistor R1, a first capacitor C1, a second transistor T2, a second resistor R2, a second capacitor C2, a common resistor R_C, and a common capacitor C_C.

Each of the first transistor T1 and the second transistor T2 may be implemented as a dual gate transistor. For example, the dual gate transistor may include an auxiliary gate electrode (or bottom gate electrode) disposed on the bottom of a semiconductor layer comprising a channel, in addition to a gate electrode disposed on the top of the semiconductor layer.

A first electrode of the first transistor T1 may be electrically connected to a first gate power line VGHL, and a second electrode of the first transistor T1 may be electrically connected to a signal line SL. A gate electrode of the first transistor T1 may be electrically connected to the signal line SL through the first resistor R1. An auxiliary gate electrode of the first transistor T1 may be electrically connected to a reference gate power line VGLL2 (or third voltage line) through the common resistor R_C. The reference gate power line VGLL2 may include the gate power line GPL (refer to FIG. 1) or the power line PL (refer to FIG. 1), and a reference gate power voltage VGL2 (or third voltage) may be applied to the reference gate power line VGLL2. The reference gate power voltage VGL2 may have a voltage level lower than a voltage level of a second gate power voltage VGL.

When the reference gate power voltage VGL2 is applied to the auxiliary gate electrode of the first transistor T1, a threshold voltage of the first transistor T1 may be positive-shifted. A leakage current flowing through the first transistor T1 decreases under a condition in which a gate-source voltage is 0V, and occurrence of a short circuit between the first gate power line VGHL and a second gate power line VGLL may be prevented.

The first resistor R1 may be electrically connected between the gate electrode of the first transistor T1 and the signal line SL, and the first capacitor C1 may be disposed (or formed) or electrically connected between the gate electrode of the first transistor T1 and the signal line SL.

The first resistor R1 (also, the second resistor R2, and the common resistor R_C) may have a resistance value greater than a resistance value of the signal line SL. For example, the first resistor R1 may have a width narrower than a width of the signal line SL, have a zigzag shape, or include a material having a low electrical conductivity. For example, the resistance value of the first resistor R1 (also, the second resistor R2, and the common resistor R_C) may be about a few tens of KQ.

When the surge voltage having the relatively high voltage level is applied to the signal line SL, the first resistor R1 (also, the second resistor R2, and the common resistor R_C) may consume energy of the surge voltage in the form of heat, and be cut off while being melted by the heat. The first resistor R1 may electrically disconnect (or open) the connection between the signal line SL and the gate electrode of the first transistor T1 by sacrificing itself, so that the first transistor T1 can be prevented from being damaged by the surge voltage.

The first capacitor C1 may maintain a voltage difference between the signal line SL and the gate electrode of the first transistor T1 within a reference range. For example, when a surge voltage having a relatively high voltage level is applied to the signal line SL, the voltage of the gate electrode of the first transistor T1 may be boosted by the first capacitor C1, and the first capacitor C1 may allow the voltage difference between the signal line SL and the gate electrode of the first transistor T1 not to become too high. Thus, the first transistor T1 can be additionally prevented from being damaged by the surge voltage.

When the first resistor R1 is open (or open-circuited) due to the surge voltage, the first capacitor C1 may boost the voltage of the gate electrode of the first transistor T1, so that the first transistor T1 may operate. The first transistor T1 may operate through capacitor coupling of the first capacitor C1. Thus, even when the surge voltage is continuously generated (e.g., even when the surge voltage is additionally generated after the first transistor T1 is damaged), the protection circuit PC may protect a display circuit DISPC.

The first transistor T1, the first resistor R1, and the first capacitor C1 may comprise a first sub-protection circuit PC_S1 for protecting the display circuit DISPC from a surge voltage having a high voltage level.

A first electrode of the second transistor T2 may be electrically connected to the signal line SL, and a second electrode of the second transistor T2 may be electrically connected to the second gate power line VGLL. A gate electrode of the second transistor T2 may be electrically connected to the second gate power line VGLL through the second resistor R2. An auxiliary gate electrode of the second transistor T2 may be electrically connected to the reference gate power line VGLL2 through the common resistor R_C.

When the reference gate power voltage VGL2 is applied to the auxiliary gate electrode of the second transistor T2, a threshold voltage of the second transistor T2 may be positive-shifted. Thus, a leakage current flowing through the second transistor T2 decreases under a condition in which a gate-source voltage is 0V, and occurrence of a short circuit between the first gate power line VGHL and the second gate power line VGLL may be prevented.

The second resistor R2 may be electrically connected between the gate electrode of the second transistor T2 and the second gate power line VGLL, and the second capacitor C2 may be disposed (or formed) or electrically connected between the signal line SL and the gate electrode of the second transistor T2.

The second resistor R2 (also, the first resistor R1, or the common resistor R_C) may consume the energy of the surge voltage in the form of heat, or electrically disconnect (or open) the connection between the gate electrode of the second transistor T2 and the second gate power line VGLL by scarifying itself. Thus, the second resistor R2 can prevent the second transistor T2 from being damaged by the surge voltage.

Similar to the first capacitor C1, the second capacitor C2 may maintain a voltage difference between the signal line SL and the gate electrode of the second transistor T2 within a reference range. Thus, the second capacitor C2 can prevent the second transistor T2 from being damaged by the surge voltage.

When the second resistor R2 is open (or open-circuited) due to the surge voltage, the second capacitor C2 may boost the voltage of the gate electrode of the second transistor T2, so that the second transistor T2 may operate. Even when the surge voltage is continuously generated (e.g., even when the surge voltage is additionally generated after the second transistor T2 is damaged), the protection circuit PC may protect the display circuit DISPC.

The second transistor T2, the second resistor R2, and the second capacitor C2 may comprise a second sub-protection circuit PC_S2 for protecting the display circuit DISPC from a surge voltage having a low voltage level.

An end of the common resistor R_C may be electrically connected to the auxiliary gate electrode of each of the first and second transistors T1 and T2, and another end of the common resistor R_C may be electrically connected to the reference gate power line VGLL2.

The reference gate power voltage VGL2 may be applied to the auxiliary gate electrode of each of the first and second transistors T1 and T2. Thus, a leakage current can be decreased, and a short circuit can be prevented from occurring between the first gate power line VGHL and the second gate power line VGLL.

In an embodiment, a voltage level of the reference gate power voltage VGL2 may be changed in a stepwise manner as time elapses. For example, when the reference gate power voltage VGL2 having a specific voltage level is continuously applied to the first and second transistors T1 and T2, the threshold voltage of each of the first and second transistors T1 and T2 may be further positive-shifted. The voltage level of the reference gate power voltage VGL2 may be cyclically or changed in a stepwise manner corresponding to a degree to which the threshold voltage of each of the first and second transistors T1 and T2 is shifted (data on the shift of the threshold voltages that may be acquired through repeated experiments).

The common resistor R_C (also, the first resistor R1, or the second resistor R2) may consume the energy of the surge voltage in the form of heat, or electrically disconnect (or open) the connection between the auxiliary gate electrode of each of the first and second transistors T1 and T2 and the reference gate power line VGLL2 by sacrificing itself.

The common capacitor C_C may be disposed (or formed) or electrically connected between the signal line SL and an end of the common resistor R_C (or the auxiliary gate electrode of each of the first and second transistors T1 and T2).

Similar to the second capacitor C2, the common capacitor C_C may maintain a voltage difference between the signal line SL and the auxiliary gate electrode of each of the first and second transistors T1 and T2 within a reference range. Thus, the common capacitor C_C can prevent the first and second transistors T1 and T2 from being damaged by the surge voltage. Even when the common resistor R_C is open, the common capacitor C_C may boost the voltage of the auxiliary gate electrode of each of the first and second transistors T1 and T2, so that the first and second transistors T1 and T2 may operate.

As described above, the protection circuit PC applies the reference gate power voltage VGL2 to the auxiliary gate electrode of each of the first and second transistors T1 and T2. Thus, a leakage current can be decreased, and a short circuit can be prevented from occurring between the first gate power line VGHL and the second gate power line VGLL.

The protection circuit PC includes resistors (the first resistor R1, the second resistor R2, and the common resistor R_C) connected to the gate electrodes (and the auxiliary gate electrodes) of the first and second transistors T1 and T2, so that damage to the first and second transistors T1 and T2 by a surge voltage may be prevented.

Further, the protection circuit PC includes capacitors (the first capacitor C1, the second capacitor C2, and the common capacitor C_C) formed or connected between the gate electrodes (and the auxiliary gate electrodes) of the first and second transistors T1 and T2 and the signal line SL, so that the first and second transistors T1 and T2 can be prevented from being damaged by the surge voltage. Even when the resistors (the first resistor R1, the second resistor R2, and the common resistor R_C) are open, the first and second transistors T1 and T2 may operate normally. Although a relatively high surge repeatedly occurs, the protection circuit PC can more stably protect the display circuit DISPC. When the protection circuit PC protects the display circuit DISPC from a surge occurring in a manufacturing process, the yield of the display panel DP (or the display device DD) can be improved.

Figure 7:
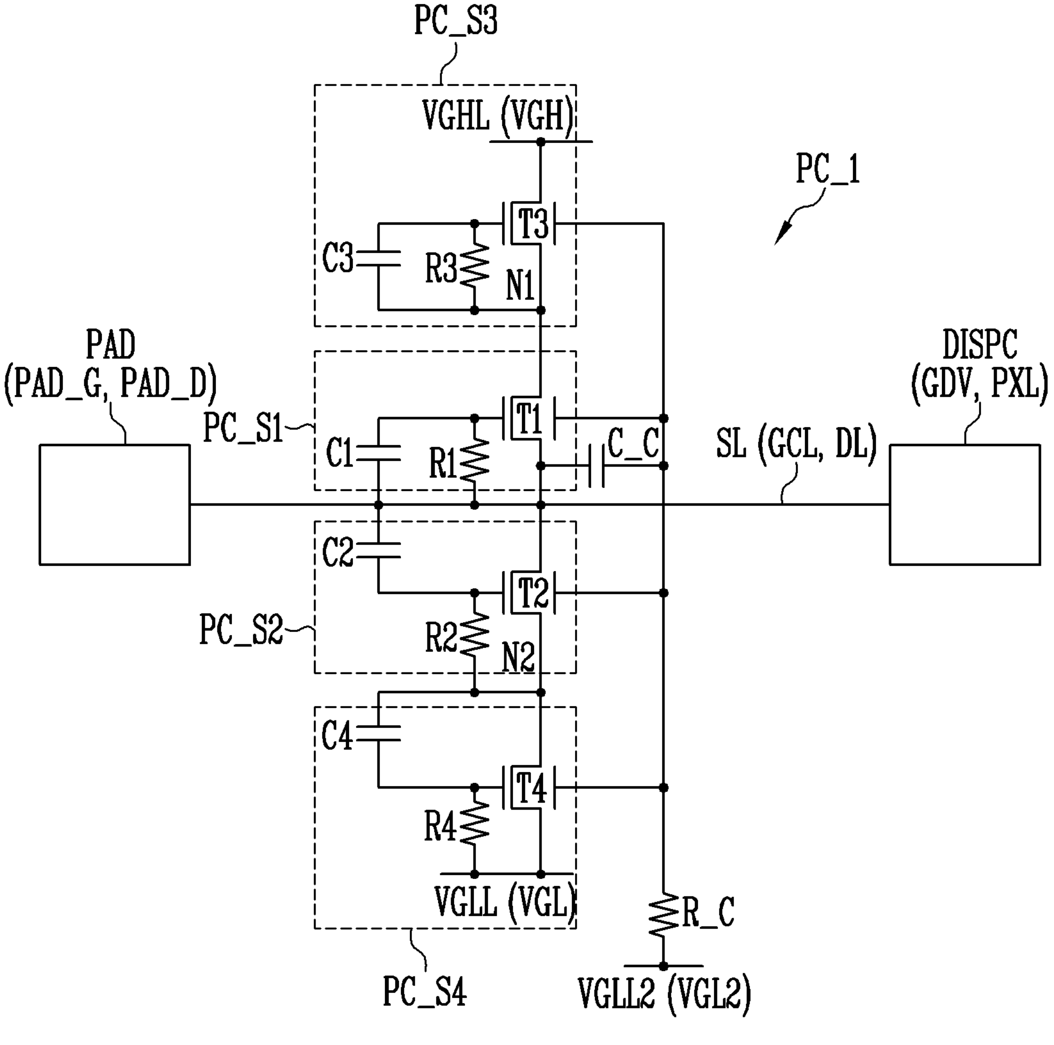
FIGS. 7, 8, and 9 are schematic diagrams of equivalent circuits illustrating embodiments of the protection circuit included in the display device of FIG. 1.
Figure 8:
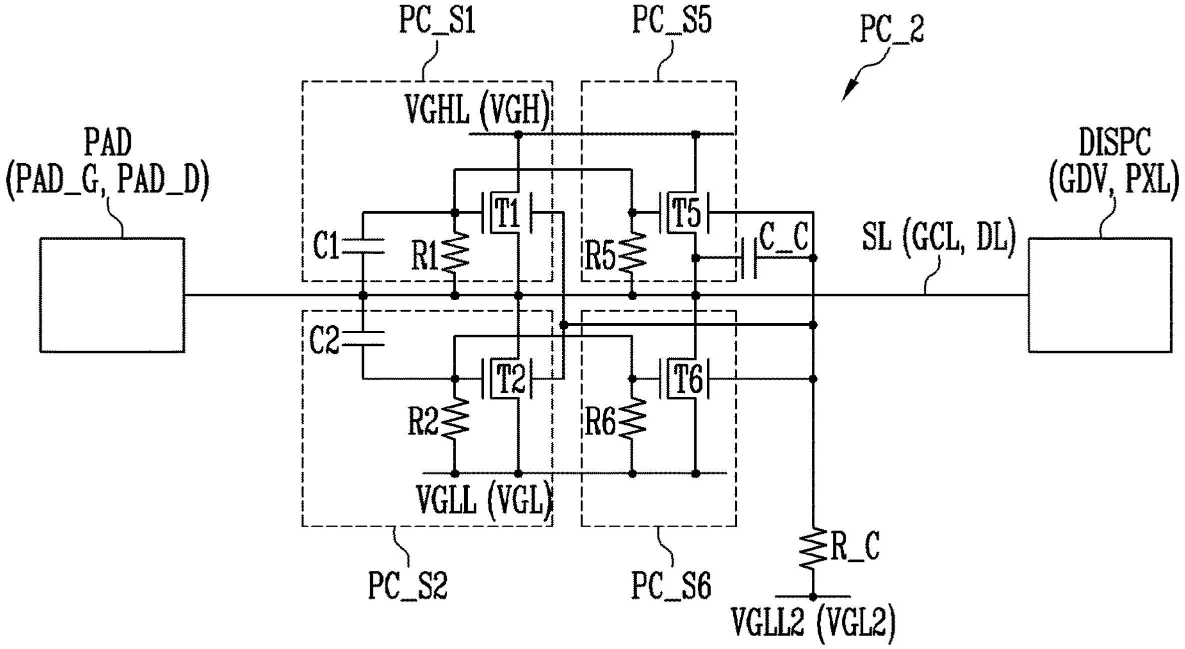
Figure 9:
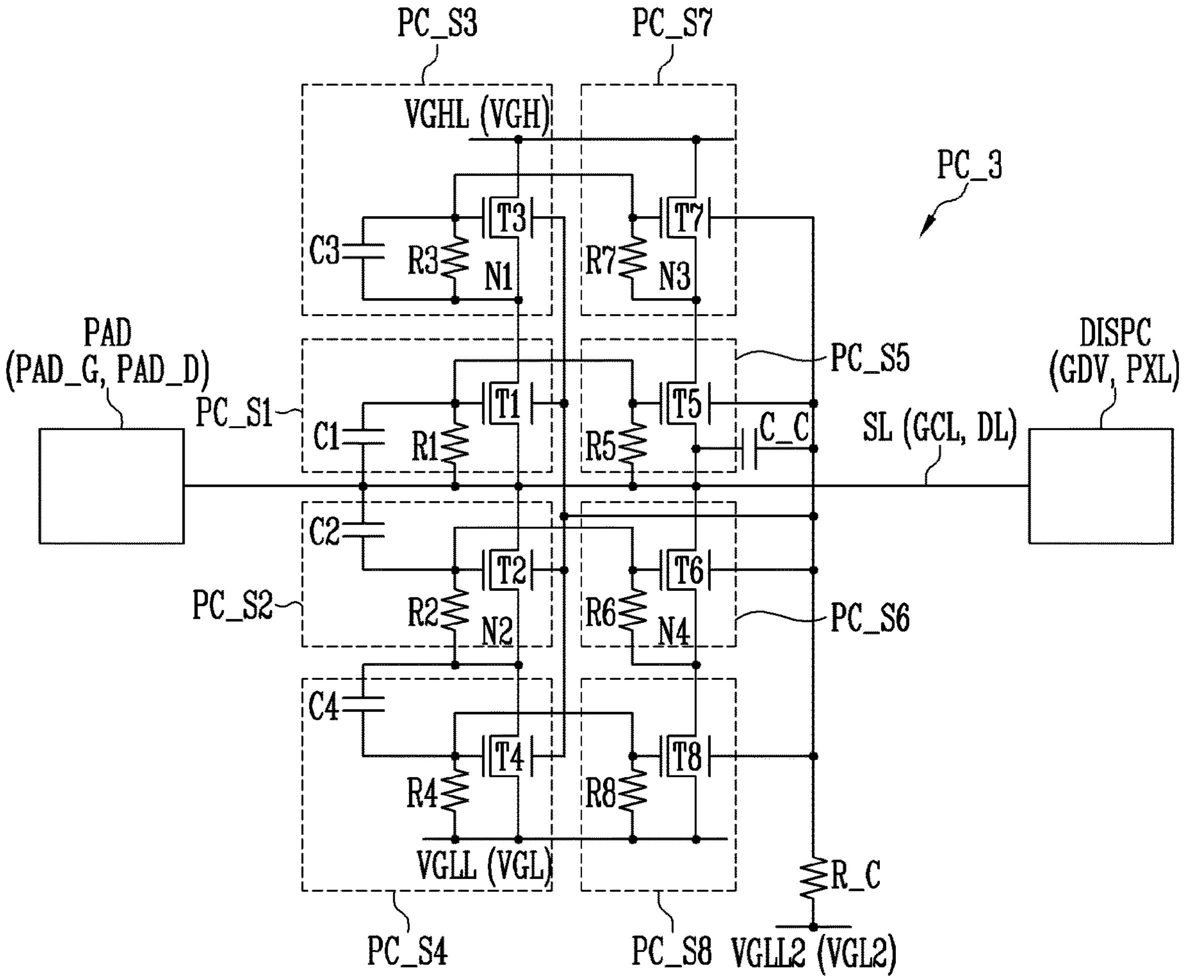

FIGS. 7, 8, and 9 are schematic diagrams of equivalent circuits illustrating other embodiments of the protection circuit included in the display device of FIG. 1.

Referring to FIGS. 6 to 9, each of protection circuits PC_1, PC_2, and PC_3 may include sub-circuits connected in series (or cascade) and/or in parallel between the first gate power line VGHL and the second gate power line VGLL.

Referring to FIG. 7, the protection circuit PC_1 of FIG. 7 may further include a third sub-protection circuit PC_S3 and a fourth protection circuit PC_S4, as compared with the protection circuit PC of FIG. 6.

The third sub-protection circuit PC_S3 may be electrically connected between the first sub-protection circuit PC_S1 and the first gate power line VGHL. The first sub-protection circuit PC_S1 may be electrically connected between a first node N1 and the signal line SL, and the third sub-protection circuit PC_S3 may be electrically connected between the first gate power line VGHL and the first node N1.

The third sub-protection circuit PC_S3 may include a third transistor T3, a third resistor R3, and a third capacitor C3. The configuration and functions of the third sub-protection circuit PC_S3 may be substantially identical to the configuration and functions of the first sub-protection circuit PC_S1. Therefore, redundant descriptions will not be repeated.

A first electrode of the third transistor T3 may be electrically connected to the first gate power line VGHL, and a second electrode of the third transistor T3 may be electrically connected to the first node N1. A gate electrode of the third transistor T3 may be electrically connected to the first node N1 through the third resistor R3. An auxiliary gate electrode of the third transistor T3 may be electrically connected to the reference gate power line VGLL2 through the common resistor R_C.

The third resistor R3 may be electrically connected between the gate electrode of the third transistor T3 and the first node N1, and the third capacitor C3 may be disposed (or formed) or electrically connected between the gate electrode of the third transistor T3 and the first node N1.

The fourth sub-protection circuit PC_S4 may be electrically connected between the second sub-protection circuit PC_S2 and the second gate power line VGLL. The second sub-protection circuit PC_S2 may be connected between the signal line SL and a second node N2, and the fourth sub-protection circuit PC_S4 may be electrically connected between the second node N2 and the second gate power line VGLL.

The fourth sub-protection circuit PC_S4 may include a fourth transistor T4, a fourth resistor R4, and a fourth capacitor C4. The configuration and functions of the fourth sub-protection circuit PC_S4 may be substantially identical to the configuration and functions of the second sub-protection circuit PC_S2. Therefore, redundant descriptions will not be repeated.

A first electrode of the fourth transistor T4 may be electrically connected to the second node N2, and a second electrode of the fourth transistor T4 may be electrically connected to the second gate power line VGLL. A gate electrode of the fourth transistor T4 may be electrically connected to the second gate power line VGLL through the fourth resistor R4. An auxiliary gate electrode of the fourth transistor T4 may be electrically connected to the reference gate power line VGLL2 through the common resistor R_C.

The fourth resistor R4 may be electrically connected between the gate electrode of the fourth transistor T4 and the second gate power line VGLL, and the fourth capacitor C4 may be disposed (or formed) or electrically connected between the second node N2 and the gate electrode of the fourth transistor T4.

A surge voltage applied to the signal line SL may be distributed to the first and third sub-protection circuits PC_S1 and PC_S3 or the second and fourth sub-protection circuits PC_S2 and PC_S4. Accordingly, a gate-source voltage of each of the first to fourth transistors T1 to T4 becomes low, and damage of the first to fourth transistors T1 to T4 can be prevented.

Referring to FIG. 8, the protection circuit PC_2 of FIG. 8 may further include a fifth sub-protection circuit PC_S5 and a sixth sub-protection circuit PC_S6, as compared with the protection circuit PC of FIG. 6.

The fifth sub-protection circuit PC_S5 may include fifth transistor T5 and a fifth resistor R5. The configuration and functions of the fifth sub-protection circuit PC_S5 may be substantially identical to the configuration and the functions of the first sub-protection circuit PC_S1. Therefore, redundant descriptions will not be repeated.

A first electrode of the fifth transistor T5 may be electrically connected to the first gate power line VGHL, and a second electrode of the fifth transistor T5 may be electrically connected to the signal line SL. A gate electrode of the fifth transistor T5 may be electrically connected to the signal line SL through the fifth resistor R5. Also, the gate electrode of the fifth transistor T5 may be electrically connected to the gate electrode of the first transistor T1 and the first capacitor C1. An auxiliary gate electrode of the fifth transistor T5 may be electrically connected to the reference gate power line VGLL2 through the common resistor R_C.

The fifth resistor R5 may be electrically connected between the gate electrode of the fifth transistor T5 and the signal line SL.

The sixth sub-protection circuit PC_S6 may include a sixth transistor T6 and a sixth resistor R6. The configuration and functions of the sixth sub-protection circuit PC_S6 may be substantially identical to the configuration and the functions of the second sub-protection circuit PC_S2. Therefore, redundant descriptions will not be repeated.

A first electrode of the sixth transistor T6 may be electrically connected to the signal line SL, and a second electrode of the sixth transistor T6 may be electrically connected to the second gate power line VGLL. A gate electrode of the sixth transistor T6 may be electrically connected to the second gate power line VGLL through the sixth resistor R6. Also, the gate electrode of the sixth transistor T6 may be electrically connected to the gate electrode of the second transistor T2 and the second capacitor C2. An auxiliary gate electrode of the sixth transistor T6 may be electrically connected to the reference gate power line VGLL2 through the common resistor R_C.

The sixth resistor R6 may be electrically connected between the gate electrode of the sixth transistor T6 and the second gate power line VGLL.

An electrostatic discharge can be more rapidly performed through the first and second sub-protection circuits PC_S1 and PC_S2 and the fifth and sixth sub-protection circuits PC_S5 and PC_S6. Although one of the first and fifth sub-protection circuits PC_S1 and PC_S5 or one of the second and sixth sub-protection circuits PC_S2 and PC_S6 is damaged, the protection circuit PC_2 may operate normally.

Referring to FIG. 9, the protection circuit PC_3 of FIG. 9 may further include a seventh sub-protection circuit PC_S7 and an eighth sub-protection circuit PC_S8, as compared with the protection circuits PC, PC_1, and PC_2 of FIGS. 6 to 8.

The seventh sub-protection circuit PC_S7 may be electrically connected between the fifth sub-protection circuit PC_S5 and the first gate power line VGHL. The fifth sub-protection circuit PC_S5 may be electrically connected between a third node N3 and the signal line SL, and the seventh sub-protection circuit PC_S7 may be electrically connected between the first gate power line VGHL and the third node N3.

The seventh sub-protection circuit PC_S7 may include a seventh transistor T7 and a seventh resistor R7. The configuration and functions of the seventh sub-protection circuit PC_S7 may be substantially identical to the configuration and the functions of the third sub-protection circuit PC_S3. Therefore, redundant descriptions will not be repeated.

A first electrode of the seventh transistor T7 may be electrically connected to the first gate power line VGHL, and a second electrode of the seventh transistor T7 may be electrically connected to the third node N3. A gate electrode of the seventh transistor T7 may be electrically connected to the third node N3 through the seventh resistor R7. Also, the gate electrode of the seventh transistor T7 may be electrically connected to the gate electrode of the third transistor T3 and the third capacitor C3. An auxiliary gate electrode of the seventh transistor T7 may be electrically connected to the reference gate power line VGLL2 through the common resistor R_C.

The seventh resistor R7 may be electrically connected between the gate electrode of the seventh transistor T7 and the third node N3.

The eighth sub-protection circuit PC_S8 may be electrically connected between the sixth sub-protection circuit PC_S6 and the second gate power line VGLL. The sixth sub-protection circuit PC_S6 may be electrically connected between the signal line SL and a fourth node N4. The eighth sub-protection circuit PC_S8 may be electrically connected between the fourth node N4 and the second gate power line VGLL.

The eighth sub-protection circuit PC_S8 may include an eighth transistor T8 and an eighth resistor R8. The configuration and functions of the eighth sub-protection circuit PC_S8 may be substantially identical to the configuration and the functions of the fourth sub-protection circuit PC_S4. Therefore, redundant descriptions will not be repeated.

A first electrode of the eighth transistor T8 may be electrically connected to the fourth node N4, and a second electrode of the eighth transistor T8 may be electrically connected to the second gate power line VGLL. A gate electrode of the eighth transistor T8 may be electrically connected to the second gate power line VGLL through the eighth resistor R8. Also, the gate electrode of the eighth transistor T8 may be electrically connected to the gate electrode of the fourth transistor T4 and the fourth capacitor C4. An auxiliary gate electrode of the eighth transistor T8 may be electrically connected to the reference gate power line VGLL2 through the common resistor R_C.

The eighth resistor R8 may be electrically connected between the gate electrode of the second transistor T2 and the second gate power line VGLL.

A surge voltage applied to the signal line SL may be distributed to the first to eighth sub-protection circuits PC_S1 to PC_S8. Accordingly, a gate-source voltage of each of the first to eighth transistors T1 to T8 becomes low, and damage of the first to eighth transistors T1 to T8 can be prevented.

An electrostatic discharge can be more rapidly performed through the first to eighth sub-protection circuits PC_S1 to PC_S8. Although some of the first to eighth sub-protection circuits PC_S1 to PC_S8 are damaged, the protection circuit PC_3 may operate normally. For example, although a relatively high surge repeatedly occurs, the protection circuit PC_3 may more stably protect the display circuit DISPC.

In the electrostatic discharge circuit and the display device including the same in accordance with the disclosure, transistors comprising an electrostatic discharge path are implemented with a dual gate transistor, and a specific power voltage is applied to auxiliary gate electrodes of the transistors. Thus, a leakage current of the transistors can be decreased, and a short circuit between power lines through which static electricity is discharged can be prevented.

A signal line or a power line is connected to resistors through gate electrodes (and the auxiliary gate electrodes) of the transistors, and the resistors consume energy of the static electricity in the form of heat or sacrifice themselves. Accordingly, the transistors can be prevented from being damaged by a relatively high static electricity (or surge).

The gate electrodes (and the auxiliary gate electrodes) of the transistors are capacitor-coupled to the signal line through capacitors, and the capacitors maintain a voltage difference between the signal line and the gate electrodes within a reference range. Thus, the transistors can be prevented from being damaged by a relatively high static electricity (or surge). Even when the resistors are sacrificed (or open), the transistors can be normally operated. Even when a surge voltage is continuously generated, an internal circuit connected to the signal line can be stably protected.

Embodiments have been disclosed herein, and although terms are employed, they are used and are to be interpreted in a generic and descriptive sense only and not for purpose of limitation. In some instances, as would be apparent by one of ordinary skill in the art, features, characteristics, and/or elements described in connection with an embodiment may be used singly or in combination with features, characteristics, and/or elements described in connection with other embodiments unless otherwise specifically indicated. Accordingly, it will be understood by those of ordinary skill in the art that various changes in form and details may be made without departing from the spirit and scope of the disclosure as set forth in the following claims.

What is claimed is:

1. A display device comprising:
pads and pixels;
signal lines electrically connected to the pads; and
a protection circuit electrically connected between one signal line among the signal lines and a first voltage line,
wherein the protection circuit includes:
a first transistor including a first electrode electrically connected to the first voltage line, a second electrode electrically connected to the one signal line, and a gate electrode;
a first resistor electrically connected between the gate electrode of the first transistor and the one signal line;
a first capacitor disposed between the gate electrode of the first transistor and the one signal line;
a second transistor including a first electrode electrically connected to the one signal line, a second electrode electrically connected to a second voltage line, and a gate electrode;
a second capacitor disposed between the one signal line and the gate electrode of the second transistor; and
a second resistor electrically connected between the gate electrode of the second transistor and the second electrode of the second transistor, wherein
a second voltage applied to the second voltage line is lower than a first voltage applied to the first voltage line.

2. The display device of claim 1, wherein an alternating current signal is applied to the one signal line.

3. The display device of claim 1, further comprising:
a gate driver that provides a gate signal to the pixels based on a start signal and a clock signal, wherein
the signal lines include:
a start signal line through which the start signal is provided to the gate driver; and
a clock signal line through which the clock signal is provided to the gate driver, and
the protection circuit is electrically connected to at least one of the start signal line and the clock signal line.

4. The display device of claim 1, further comprising:
a data driver that provides data signals to the pixels, wherein
the signal lines include data lines through which the data signals are provided to the pixels, and
the protection circuit is electrically connected to each of the data lines.

5. The display device of claim 1, further comprising a substrate, wherein the substrate includes:
a pad area in which the pads are disposed; and
a display area in which the pixels are disposed, and
the protection circuit is disposed in the pad area.

6. The display device of claim 1, wherein
the first resistor consumes energy of an electrostatic voltage applied to the one signal line, and
the first resistor is electrically disconnected by a heat of the energy.

7. The display device of claim 1, wherein
the first capacitor maintains a voltage difference between the one signal line and the gate electrode of the first transistor within a reference range, and
the first capacitor allows the one signal line and the gate electrode of the first transistor to be capacitor-coupled to each other to operate the first transistor in case that the first resistor is damaged.

8. The display device of claim 1, wherein
each of the first transistor and the second transistor further includes an auxiliary gate electrode, and
the protection circuit further includes:
a common resistor electrically connected between the auxiliary gate electrode of each of the first transistor and the second transistor and a third voltage line; and
a common capacitor disposed between the one signal line and the auxiliary gate electrode of each of the first transistor and the second transistor.

9. The display device of claim 8, wherein
each of the first transistor and the second transistor includes an oxide semiconductor, and
a third voltage applied to the third voltage line is lower than the second voltage applied to the second voltage line.

10. The display device of claim 9, wherein the third voltage applied to the third voltage line is cyclically changed.

11. The display device of claim 8, wherein the protection circuit further includes:
a third transistor including:
a first electrode electrically connected to the first voltage line;
a second electrode electrically connected to the first electrode of the first transistor;
a gate electrode; and
an auxiliary gate electrode electrically connected to the auxiliary gate electrode of the first transistor;

a third resistor electrically connected between the gate electrode of the third transistor and the second electrode of the third transistor; and a third capacitor disposed between the gate electrode of the third transistor and the second electrode of the third transistor.

12. The display device of claim 11, wherein the protection circuit further includes:

a fourth transistor including:

a first electrode electrically connected to the second electrode of the second transistor;

a second electrode electrically connected to the second voltage line;

a gate electrode; and an auxiliary gate electrode electrically connected to the auxiliary gate electrode of the second transistor;

a fourth capacitor disposed between the first electrode of the fourth transistor and the gate electrode of the fourth transistor; and a fourth resistor electrically connected between the gate electrode of the fourth transistor and the second voltage line.

13. The display device of claim 8, wherein the protection circuit further includes:

a fifth transistor including:

a first electrode electrically connected to the first voltage line;

a second electrode electrically connected to the one signal line;

a gate electrode electrically connected to the gate electrode of the first transistor; and an auxiliary gate electrode electrically connected to the auxiliary gate electrode of the first transistor; and a fifth resistor electrically connected between the gate electrode of the fifth transistor and the second electrode of the fifth transistor.

14. The display device of claim 13, wherein the protection circuit further includes:

a sixth transistor including:

a first electrode electrically connected to the one signal line;

a second electrode electrically connected to the second voltage line;

a gate electrode electrically connected to the gate electrode of the second transistor; and an auxiliary gate electrode electrically connected to the auxiliary gate electrode of the second transistor; and a sixth resistor electrically connected between the gate electrode of the sixth transistor and the second voltage line.

15. The display device of claim 14, wherein the protection circuit further includes:

a seventh transistor including:

a first electrode electrically connected to the first voltage line;

a second electrode electrically connected to the first electrode of the fifth transistor;

a gate electrode; and an auxiliary gate electrode electrically connected to the auxiliary gate electrode of the fifth transistor;

a seventh resistor electrically connected between the gate electrode of the seventh transistor and the second electrode of the seventh transistor.

16. The display device of claim 15, wherein the protection circuit further includes:

an eighth transistor including:

a first electrode electrically connected to the second electrode of the sixth transistor;

a second electrode electrically connected to the second voltage line;

a gate electrode; and an auxiliary gate electrode electrically connected to the auxiliary gate electrode of the sixth transistor; and an eighth resistor electrically connected between the gate electrode of the eighth transistor and the second voltage line.

17. An electrostatic discharge circuit electrically connected to a signal line to which an alternating current signal is applied, the electrostatic discharge circuit comprising:

a first transistor including a first electrode electrically connected to a first voltage line, a second electrode electrically connected to the signal line, and a gate electrode;

a first resistor electrically connected between the gate electrode of the first transistor and the signal line; and a first capacitor disposed between the gate electrode of the first transistor and the signal line.

18. The electrostatic discharge circuit of claim 17, further comprising:

a second transistor including a first electrode electrically connected to the signal line, a second electrode electrically connected to a second voltage line, and a gate electrode;

a second capacitor disposed between the signal line and the gate electrode of the second transistor; and a second resistor electrically connected between the gate electrode of the second transistor and the second electrode of the second transistor, wherein a second voltage applied to the second voltage line is lower than a first voltage applied to the first voltage line.

19. The electrostatic discharge circuit of claim 18, wherein each of the first transistor and the second transistor further includes an auxiliary gate electrode, and the electrostatic discharge circuit further comprises:

a common resistor electrically connected between the auxiliary gate electrode of each of the first transistor and the second transistor and a third voltage line; and a common capacitor disposed between the signal line and the auxiliary gate electrode of each of the first transistor and the second transistor.

* * * * *